(12) United States Patent
Pirat

(10) Patent No.: US 9,346,549 B2
(45) Date of Patent: May 24, 2016

(54) METHOD FOR REGULATING THE DE-ICING OF A LEADING EDGE OF AN AIRCRAFT AND DEVICE FOR ITS IMPLEMENTATION

(71) Applicant: Airbus Operations S.A.S., Toulouse (FR)

(72) Inventor: Guillaume Pirat, Tecou (FR)

(73) Assignee: Airbus Operations S.A.S. (FR)

( * ) Notice: Subject to any disclaimer, the term of this patent is extended or adjusted under 35 U.S.C. 154(b) by 0 days.

(21) Appl. No.: 14/444,068

(22) Filed: Jul. 28, 2014

(65) Prior Publication Data

US 2015/0034767 A1 Feb. 5, 2015

(30) Foreign Application Priority Data

Jul. 30, 2013 (FR) ..................... 13 57521

(51) Int. Cl.
| | | |
|---|---|---|
| *B64D 15/02* | (2006.01) | |
| *B64D 15/04* | (2006.01) | |
| *F16K 31/12* | (2006.01) | |
| *F02C 7/047* | (2006.01) | |
| *B64D 33/02* | (2006.01) | |

(52) U.S. Cl.
CPC ............... *B64D 15/04* (2013.01); *F02C 7/047* (2013.01); *F16K 31/12* (2013.01); *B64D 2033/0233* (2013.01)

(58) Field of Classification Search
CPC .. B64D 15/04; B64D 2033/0233; F02C 7/047
See application file for complete search history.

(56) References Cited

U.S. PATENT DOCUMENTS

| | | | |
|---|---|---|---|
| 3,749,336 A | 7/1973 | Christensen et al. | |
| 4,783,026 A | 11/1988 | Rumford et al. | |
| 6,443,395 B1 | 9/2002 | Porte et al. | |
| 7,959,109 B2 * | 6/2011 | Dasilva et al. | ............ 244/134 R |
| 2005/0242310 A1 | 11/2005 | Takiguchi et al. | |
| 2010/0001138 A1 | 1/2010 | Dasilva et al. | |
| 2010/0281880 A1 | 11/2010 | Porte | |
| 2010/0301238 A1 | 12/2010 | Krake et al. | |

FOREIGN PATENT DOCUMENTS

| | | |
|---|---|---|
| EP | 2 256 390 A2 | 12/2010 |
| FR | 2813581 A1 | 3/2002 |
| FR | 2 925 878 A1 | 7/2009 |
| GB | 767 177 A | 1/1957 |
| GB | 1295 092 A | 11/1972 |

OTHER PUBLICATIONS

French Search Report (FR 13 57521) (May 6, 2014).

* cited by examiner

*Primary Examiner* — Philip J Bonzell
(74) *Attorney, Agent, or Firm* — Lerner, David, Littenberg, Krumholz & Mentlik, LLP

(57) ABSTRACT

A method of regulating the de-icing of a leading edge of an aircraft includes regulating the flow of air used for de-icing by at least a first regulator valve in accordance with two regulation levels, a first regulation level corresponding to the regulated position of the first regulator valve and a second regulation level corresponding to the fully open position of the first regulator valve. A de-icing device enables implementation of the regulation method.

14 Claims, 2 Drawing Sheets

METHOD FOR REGULATING THE DE-ICING OF A LEADING EDGE OF AN AIRCRAFT AND DEVICE FOR ITS IMPLEMENTATION

FIELD OF THE INVENTION

The present invention relates to a method for regulating the de-icing of a leading edge of an aircraft and to a device for implementing said method.

BACKGROUND OF THE INVENTION

In known manner, a propulsion system of an aircraft includes a nacelle in which an engine is disposed substantially concentrically. The nacelle includes at the front an air intake that is extended inside the nacelle by a duct for channeling the air in the direction of the engine.

Under some conditions, frost or ice may tend to form at the level of the air intake. It is necessary to limit this formation of frost or ice in order to prevent blocks of ice being ingested by the engine and damaging it. To this end, the nacelle includes a de-icing (Nacelle Anti Ice) device. In the remainder of the description, the term de-icing encompasses the treatment of both frost and ice.

The present invention relates more particularly to nacelles incorporating a pneumatic de-icing device utilizing hot air bled from the compressor of the engine and injected at the level of the air intake and more particularly brought into contact with the internal wall of the air intake.

In an embodiment known from the documents FR-2.813.581 and U.S. Pat. No. 6,443,395, shown in FIG. 1, a nacelle includes internally a partition 12 referred to as the "front frame" that delimits with the air intake 14 an annular duct 16 also known as the "D-duct" that extends all around the circumference of the nacelle and has an approximately D-shaped section.

This duct 16 includes a hot air feed with at least one orifice 18 and an exhaust 20 for evacuating the cooled air used for de-icing.

The hot air is bled at the level of an outlet 24 of a compressor stage of the engine 22 and the hot air feed includes a pipe 26 for routing it to the orifice 18. This pipe 26 includes means 28 for measuring the pressure and a device for regulating the pressure in order to deliver the required quantity of hot air to the orifice 18.

An engine 22 includes a plurality of outlets 24, 24', 24" each with a different temperature/pressure combination. The outlet 24 is chosen by arriving at a compromise between the hot air requirements for de-icing and the structural and thermal capabilities of the air intake 14. Thus the bled flow of air must have a high pressure and a high temperature to ensure effective de-icing. On the other hand, too high a temperature and/or pressure may damage the air intake, which is generally made from composite materials and/or aluminum alloy.

The device for regulating the pressure includes a first pressure regulator valve 30 and a pressure regulator and shut-off valve 32.

The pressure regulator valve 30 is controlled by a solenoid and can occupy two positions as a function of a signal S1 received by the solenoid, a totally open position when receiving a signal S1 and a regulated position in the absence of a signal S1. This valve 30 is regulated pneumatically with a single regulation level.

The pressure regulator and shut-off valve 32 is controlled by two solenoids adapted to receive respective signals S2 and S3. Accordingly, the pressure regulator and shut-off valve 32 can occupy three positions, a fully open position in the absence of signals S2 and S3, a regulated position on reception of a signal S2 and a closed position on reception of a signal S3. This valve 32 is regulated pneumatically with a single regulation level identical to that of the pressure regulator valve 30.

In the absence of electrical signals S1, S2, S3, the pressure regulator and shut-off valve 32 is in the fully open position while the regulator valve 30 is in the regulated position.

In a known mode of operation, the valves 30 and 32 have the same regulation level with a set point pressure of the order of 5.175+/−0.3 bar (75+/−5 psig).

The valves 30 and 32 must have the same regulation level to provide a redundant regulation system, a malfunction of the pressure regulator valve 30 being compensated by the pressure regulator and shut-off valve 32 going to the regulated position on reception of a signal S2. Accordingly, the fully open position of each regulator valve is simply used to allow the other valve to perform the regulation according to the single regulation level and thus to prevent any pneumatic interaction between the two valves.

The de-icing device can occupy two states, an activated (ON) first state in which the air intake is fed with hot air at a pressure higher than the regulation level and a deactivated (OFF) second state in which the air intake is no longer fed with hot air.

Accordingly, in normal operation, the activated state corresponds to the regulated position of the pressure regulator valve 30 and to the fully open position of the pressure regulator and shut-off valve 32, in the absence of signals S1, S2, S3, or, in the event of a malfunction of the pressure regulator valve 30 in the fully open position, to the regulated position of the pressure regulator and shut-off valve 32, on reception of signal S2.

The deactivated state corresponds to the closed position of the pressure regulator and shut-off valve 32 on reception of a signal S3.

Even if it has numerous advantages, the prior art regulator device cannot be fully satisfactory because regulation can be effected only in accordance with a single regulation level.

Accordingly, in certain circumstances, for example for certain engines, it is not possible with a single regulation level to arrive at a compromise between effective de-icing and the maximum temperature and pressure acceptable by the air intake for all flight phases.

For other hot air requirements of the aircraft, such as air conditioning the cabin, for example, the flow of hot air bled from the engine must be regulated more flexibly, in accordance with a plurality of regulation levels.

To achieve this objective, a first solution consists in using at least two hot air outlets 24, 24' of the engine, the two outlets being connected alternately as a function of the flight phases and/or external conditions. This solution is not entirely satisfactory because it leads to a more costly and more complex architecture that is not suitable for an engine environment that is already subject to severe constraints in terms of available space, temperature and vibration.

A second solution would be to use a heat exchanger to modify the temperature of the regulated flow of air. However, this solution is relatively costly and complex and leads to an increase in the onboard mass.

Finally, a third solution would be to use an electrohydraulic servovalve for proportional control of a hydraulic pressure (and therefore a degree of opening of the flap) as a function of an electrical signal. This solution is not entirely satisfactory because it leads to considerably increased complexity of the control logic, valve technology level and system control.

BRIEF SUMMARY OF THE INVENTION

Thus the present invention aims to eliminate the drawbacks of the prior art.

To this end, an aspect of the invention provides a method for regulating the de-icing of a leading edge of an aircraft, wherein the regulation method consists in regulating the flow of air used for de-icing using at least a first regulator valve in accordance with two regulation levels, a first regulation level corresponding to the regulated position of said first regulator valve and a second regulation level corresponding to the fully open position of said first regulator valve.

Being able to regulate the flow of air in accordance with two regulation levels makes it possible, using a single source of hot air, to optimize the flow of hot air transmitted for de-icing the air intake and to adapt it notably as a function of the capabilities of the hot air source and/or surrounding conditions in order to obtain a flow of air sufficient to achieve de-icing without risk of damaging the air intake because of too high a temperature of the flow of hot air.

The regulator device preferably includes two regulator valves.

In this case, the regulation method is wherein it enables the flow of air to be regulated in accordance with two regulation levels, a first regulation level corresponding to the regulated position of the first regulator valve or possibly of the second regulator valve in the event of a malfunction of the first regulator valve and a second regulation level corresponding to the fully open position of the two regulator valves.

The first regulation level preferably corresponds to a pressure of the order of 3.45+/−0.3 bar, less than the pressure at the single regulation level of a prior art regulator device.

A control system is advantageously provided to control the regulator valve or valves and to switch the de-icing device automatically to an activated state at the first regulation level or to an activated state at the second regulation level.

In accordance with another feature, the control system switches the de-icing device to the activated state at the first regulation level or the activated state at the second regulation level as a function of at least one characteristic of the flow of hot air and/or at least one parameter of the air around the aircraft.

In accordance with one embodiment, the hot air source is provided by at least one outlet of an engine of the aircraft and at least one characteristic of the flow of hot air is supplied by an engine control system. In this case, the characteristic or characteristics of the flow of hot air is or are preferably calculated from parameters of the engine known to the engine control system.

In accordance with another feature, the control system switches the de-icing device from the activated state at the first regulation level to the activated state at the second regulation level or from the activated state at the second regulation level to the activated state at the first regulation level if at least one characteristic of the flow of hot air and/or at least one parameter of the air around the aircraft has a value that falls below a given threshold K1 or rises above a given threshold K2, respectively. In this case, the given threshold K1 is preferably lower than the given threshold K2.

In accordance with its control logic, the control system switches the de-icing device to the activated state at the second regulation level when the total air temperature TAT is lower than a total air temperature threshold TATref1, the temperature ST of the hot air supplied by the hot air source is less than a temperature threshold STref1 and the pressure SP of the hot air supplied by the hot air source is lower than a pressure threshold SPref1. The control system switches the de-icing device to the activated state at the first regulation level when the total air temperature TAT is higher than a total air temperature threshold TATref2 or the temperature ST of the hot air supplied by the hot air source is higher than a threshold temperature STref2 or the pressure SP of the hot air supplied by the hot air source is higher than a pressure threshold SPref2.

Another aspect of the invention also proposes a device for de-icing a leading edge of an aircraft that is wherein it includes a control system that controls at least one valve for regulating a flow of hot air used for de-icing and automatically switches the de-icing device to an activated state at a first regulation level or to an activated state at a second regulation level.

BRIEF DESCRIPTION OF THE DRAWINGS

Other features and advantages will emerge from the following description of the invention, given by way of example only, with reference to the appended drawings, in which.

DETAILED DESCRIPTION

Figure 1:
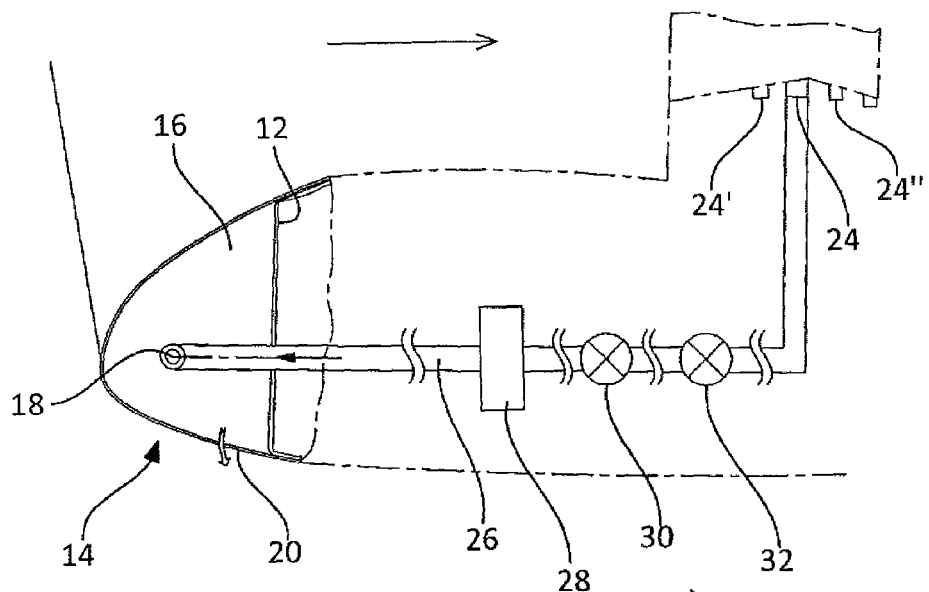
FIG. 1, which illustrates the prior art, is a diagrammatic representation of part of a nacelle of an aircraft incorporating a device for de-icing an air intake, FIG. 2, which illustrates the an embodiment of the invention, is a diagrammatic representation of part of a nacelle of an aircraft incorporating a device for de-icing an air intake.
Figure 2:
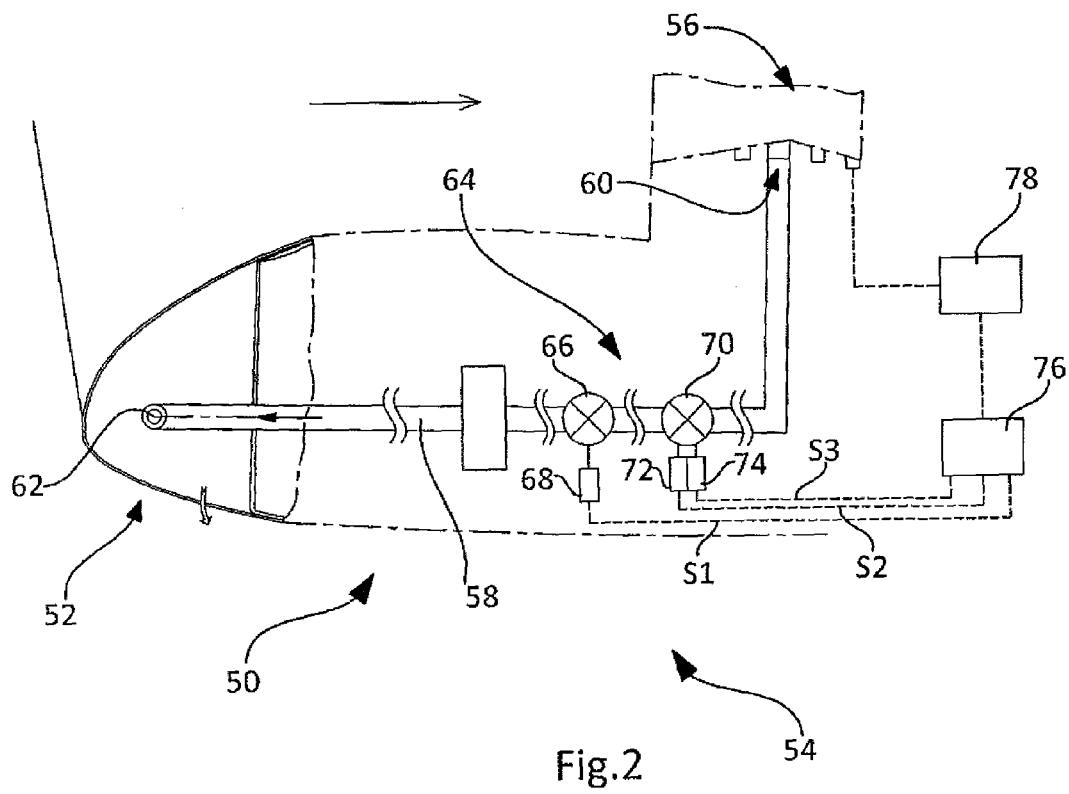

In FIG. 2 is represented a device 50 for de-icing an air intake 52 of a nacelle 54 of an aircraft in which an engine 56 is located.

This de-icing device uses hot air and includes a duct 58 for routing a flow of hot air from a hot air source 60 to at least one outlet 62 and a regulator device 64 for controlling the flow of hot air flowing in the duct.

The outlet 62 and the duct 58 are not described in more detail because they can be identical to those of the prior art.

The hot air supplied by the hot air source 60 is characterized by an energy level SE which is a function notably of the temperature ST and/or the pressure SP of the hot air supplied by the hot air source 60. In accordance with one embodiment, the engine 56 includes a plurality of hot air outlets each with a different temperature/pressure combination. Each hot air outlet can constitute a hot air source 60 for the de-icing device.

The hot air outlet of the engine is chosen notably as a function of the hot air requirements for de-icing, the structural and thermal capabilities of the air intake 52 and the integration of the duct 58.

The regulator device 64 includes at least a first regulator valve 66.

The first regulator valve 66 is controlled by a controller 68 and can occupy two positions as a function of a signal S1 received by the controller 68, a fully open position on reception of a signal S1 and a regulated position in the absence of a signal S1. In the regulated position, the first regulator valve 66 effects regulation at a first regulation level.

The first regulator valve 66 is preferably identical to the prior art pressure regulator valve.

The regulator device advantageously includes a second regulator valve 70 controlled by at least one controller 72 that can occupy at least two positions as a function of at least one signal S2 received by the controller 72, a fully open position in the absence of signal S2 and a regulated position on reception of a signal S2. In the regulated position, the second regulator valve 70 effects regulation at a first regulation level identical to that of the first regulator valve 66.

Providing two regulator valves with the same regulation level produces a redundant and therefore safer system, a malfunction of the first regulator valve 66 being compensated by the second regulator valve 70.

The de-icing device preferably includes means for preventing the flow of the hot air flow in the duct 58. One of the two valves advantageously provides this function and can be set to a closed position.

The second regulator valve 70 is advantageously controlled by two controllers 72 and 74 and can occupy three positions as a function of reception of signals S2 and S3 by the controllers 72 and 74, respectively, a fully open position in the absence of signals S2 and S3, a regulated position on reception of a signal S2 and absence of signal S3, and a closed position on reception of a signal S3.

The second regulator valve 70 is preferably identical to the prior art pressure regulator and shut-off valve.

The method in accordance with the invention of regulating de-icing can therefore be implemented on existing de-icing devices without modification of the technology of the regulation units.

The regulator device 64 includes a control system 76 that controls the regulator valve or valves 66 and 70.

The method in accordance with the invention of regulating the de-icing of an air intake consists in regulating the flow of air in accordance with two regulation levels, a first regulation level corresponding to the regulated position of the first regulator valve 66 or possibly of the second regulator valve 70 in the event of a malfunction of the first regulator valve 66 and a second regulation level corresponding to the fully open position of the first regulator valve 66 (if there is no second regulator valve 70) or the two regulator valves 66 and 70 (if a second regulator valve 70 is present).

Being able to regulate the flow of air in accordance with two regulation levels makes it possible, using a single hot air source 60, to optimize the flow of hot air transmitted for de-icing the air intake and to be able to adapt it notably as a function of the capabilities of the hot air source and/or the surrounding conditions in order to obtain a flow of air sufficient to achieve de-icing without risk of damaging the air intake because of too high a temperature of the flow of hot air.

In accordance with one feature of the invention, the first regulation level corresponds to a pressure of the order of 3.45+/−0.3 bar (50+/−5 psig).

The value of the first regulation level is reduced relative to the value of the single regulation level of the prior art so as to obtain a greater difference from the second regulation level, which corresponds to the fully open position.

In accordance with one mode of operation, the de-icing device can occupy three states, a deactivated state, an activated state at the first regulation level and an activated state at the second regulation level.

In accordance with its control logic, the control system 76 transmits a signal S3 to the controller 74 of the second regulator valve 70 to cause a change of position of the second regulator valve 70 to the closed position that corresponds to the deactivated state of the de-icing device.

For the de-icing device to be in the deactivated state, the control system 76 transmits no signal S3 to the controller 74 of the second regulator valve 70.

When the de-icing device is in the activated state, in the absence of signals S1 and S2 transmitted by the control system 76, the first regulator valve 66 is in the regulated position and the second regulator valve 70 in the fully open position, which corresponds to the activated state at the first regulation level of the de-icing device.

In the event of a malfunction of the first regulator valve 66, the control system 76 transmits a signal S2 so as to cause the change of position of the second regulator valve 70 to the regulated position, which corresponds to the back-up activated state at the first regulation level of the de-icing device. In parallel with this, a signal S1 is transmitted to the first regulator valve 66 so as to force it fully open and therefore prevent any pneumatic interaction with the second regulator valve 70.

When the de-icing device is in the activated state, the control system 76 can transmit a signal S1 and no signal S2 respectively to the controller 68 of the first regulator valve 66 and to the controller 72 of the second regulator valve to cause the change of position of the first regulator valve to the fully open position, the second regulator valve 70 being in the fully open position, which corresponds to the activated state at the second regulation level of the de-icing device.

The control logic is summarized in the table below:

| State | S1 | S2 | S3 | Position of first valve | Position of second valve |
|---|---|---|---|---|---|
| Deactivated | 0 | 0 | 1 | x | Closed |
| Activated at first regulation level | 0 | 0 | 0 | Regulated | Fully open |
| Activated at first regulation level (back-up) | 1 | 1 | 0 | Fully open | Regulated |
| Activated at second regulation level | 1 | 0 | 0 | Fully open | Fully open |

In accordance with another feature of the invention, the control system 76 makes it possible to switch the de-icing device automatically to the activated state at the first regulation level or the activated state at the second regulation level as a function of at least one characteristic of the flow of hot air and/or at least one parameter of the air around the aircraft. To this end, the control system 76 includes a memory for storing at least one given threshold, means for effecting at least one comparison between on the one hand at least one characteristic of the flow of hot air and/or at least one parameter of the air around the aircraft and on the other hand the given threshold(s) and means for generating at least one control signal for the regulator valve(s) as a function of the comparison or comparisons.

The comparison or comparisons is or are preferably effected in real time.

The parameter of the air around the aircraft is preferably the total air temperature TAT, which corresponds to the sum of the dynamic and static temperatures of the air in motion around the aircraft.

Figure 3:
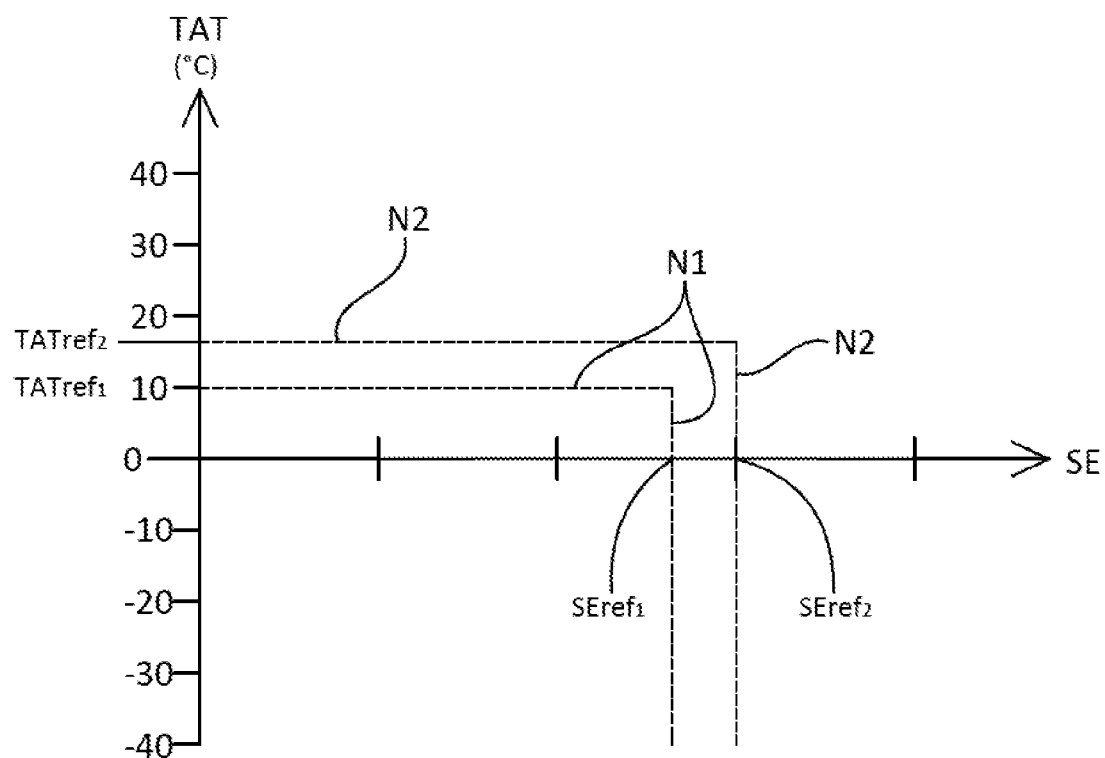
FIG. 3 is a diagram showing a first variant of control logic for a method of regulating the de-icing of an air intake.

For the characteristic or characteristics of the flow of hot air supplied by the hot air source 60, it is possible to choose the energy of the flow of air, as shown in FIG. 3.

Figure 4:
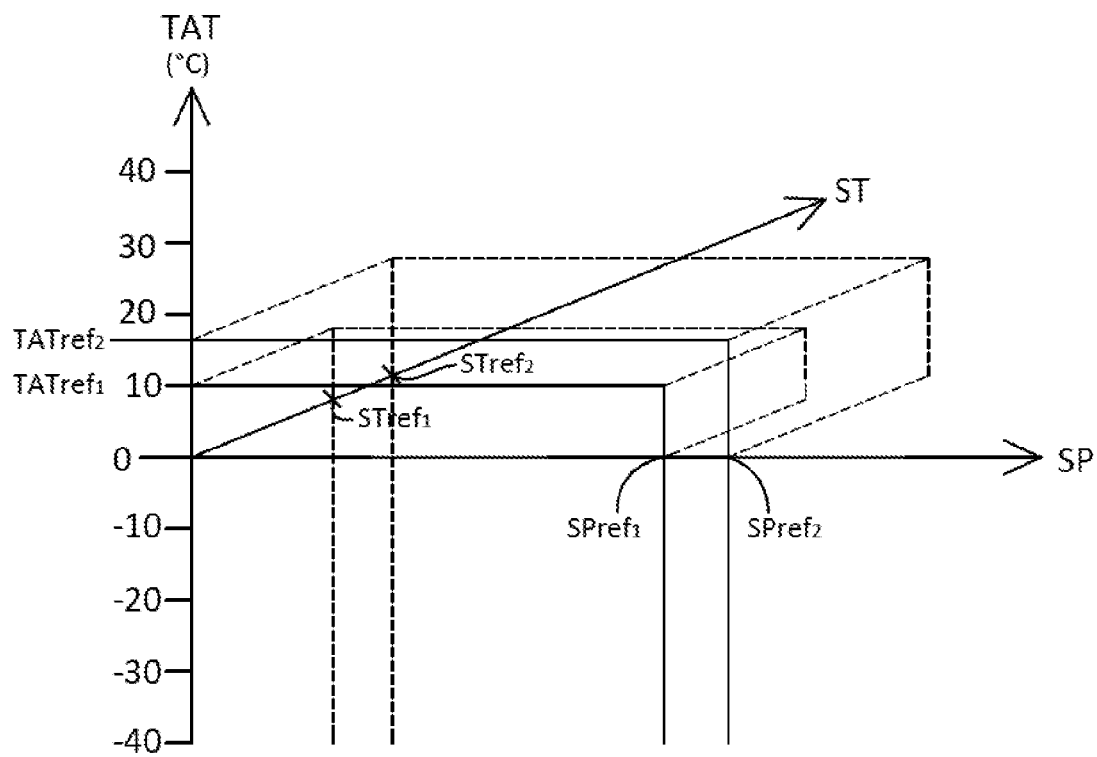
FIG. 4 is a diagram showing a second variant of control logic for a method of regulating the de-icing of an air intake.

The characteristics of the flow of hot air are preferably the temperature ST and the pressure SP of the hot air leaving the hot air source 60, as shown in FIG. 4. This solution is more particularly suitable if the flow circulating at the level of the outlet 62 is choked at the level of a flow constriction and is therefore a function only of the pressure SP and the temperature ST.

The temperature ST and the pressure SP are determined by any appropriate means.

In one embodiment, the aircraft includes for an engine 56 a control system 78 known as a full authority digital engine control (FADEC) system.

The temperature ST and the pressure SP are advantageously determined by the engine control system 78, which transmits the values of the temperature ST and the pressure SP to the control system 76 of the de-icing device. The temperature ST and the pressure SP can therefore be calculated, by modeling, from parameters known to the control system 78, such as the pressure and the temperature downstream of the high-pressure compressors of the engine. This configuration eliminates the need to install dedicated sensors for measuring the temperature ST and the pressure SP of the hot air source 60.

In accordance with its control logic, the control system 76 switches the de-icing device:
- from the activated state at the first regulation level N1 to the activated state at the second regulation level N2 when at least one characteristic of the flow of hot air AND/OR at least one parameter of the air around the aircraft has a value that falls below a given threshold K1,
- from the activated state at the second regulation level N2 to the activated state at the first regulation level N1 when at least one characteristic of the flow of hot air AND/OR at least one parameter of the air around the aircraft has a value that rises above a given threshold K2.

The control system 76 preferably switches the de-icing device:
- from the activated state at the first regulation level N1 to the activated state at the second regulation level N2 when at least one characteristic of the flow of hot air AND at least one parameter of the air around the aircraft has a value that falls below a given threshold K1,
- from the activated state at the second regulation level N2 to the activated state at the first regulation level N1 when at least one characteristic of the flow of hot air OR at least one parameter of the air around the aircraft has a value that rises above a given threshold K2.

The given threshold K1 may be identical to the given threshold K2.

The given threshold K1 is advantageously lower than the given threshold K2 so as to introduce hysteresis. This solution makes it possible to prevent repeated switching when the value of the characteristic(s) of the flow of hot air and/or of the parameter(s) of the air around the aircraft remains close to the given threshold in the case of a single threshold.

In accordance with its control logic as shown in FIG. 3, the control system 76 switches the de-icing device to the activated state at the second regulation level N2 when the total air temperature TAT is less than a total air temperature threshold TATref1 AND the energy SE of the hot air supplied by the hot air source 60 is less than an energy threshold SEref1. The control system 76 switches the de-icing device to the activated state at the first regulation level N1 when the total air temperature TAT is higher than a total air temperature threshold TATref2 OR the energy SE of the hot air supplied by the hot air source 60 is higher than an energy threshold SEref2. TATref1 is preferably lower than TATref2 and SEref1 is preferably lower than SEref2.

As shown in FIG. 4, the control system 76 preferably switches the de-icing device to the activated state at the second regulation level N2 when the total air temperature TAT is lower than a total air temperature threshold TATref1 AND the temperature ST of the hot air supplied by the hot air source 60 is lower than a temperature threshold STref1 AND the pressure SP of the hot air supplied by the hot air source 60 is lower than a pressure threshold SPref1. The control system 76 switches the de-icing device to the activated state at the first regulation level N1 when the total air temperature TAT is higher than a total air temperature threshold TATref2 OR the temperature ST of the hot air supplied by the hot air source is higher than a temperature threshold STref2 OR the pressure SP of the hot air supplied by the hot air source 60 is higher than a pressure threshold SPref2. TATref1 is preferably lower than TATref2, STref1 is preferably lower than STref2 and SPref1 is preferably lower than SPref2.

The thresholds are determined to limit the risk of damaging the structure of the air intake, notably because of too high a temperature, and so that the flow of hot air channeled by the de-icing device is sufficient to obtain satisfactory de-icing.

To determine the thresholds, the first step is to determine the critical operating point of the de-icing device by cross-checking the conditions for formation of frost and/or ice and the flight conditions of the aircraft.

Knowing these critical operating points, it is possible to determine the total air temperature threshold and the temperature and pressure thresholds of the hot air supplied by the hot air source allowing for safety factors, inaccuracies relating to the tolerances on measuring temperature and pressure values at the level of the engine and inaccuracies relating to the modeling for determining the temperature and pressure values of the hot air supplied by the hot air source 60.

According to another advantage, the AND logic for changing from the first regulation level N1 to the second regulation level N2 makes it possible to limit the risks of damaging the structure of the air intake. Any error concerning the value of the temperature or the pressure of the flow of hot air supplied by the hot air source therefore does not cause the change to the regulation level N2 that corresponds to the fully open position of the regulator valve or valves.

The regulation method is relatively simple to use because the pilot need only choose the activated or deactivated state of the de-icing device. The logic of the control system 76 automatically controls the change between the first regulation level N1 and the second regulation level N2.

Although described as applied to an air intake, the de-icing method of the invention may be applied to all pneumatic devices for de-icing a leading edge of an aircraft.

The invention claimed is:

1. A method for regulating the de-icing of a leading edge of an aircraft, said method employing a de-icing device including a duct for routing a flow of hot air from a hot air source to at least one outlet and a regulator device for regulating said flow of hot air including:
    a first regulator valve controlled by a first controller setting said first regulator valve in accordance with a fully open position and a regulated position at a first regulation level, and
    a second regulator valve controlled by a second controller setting said second regulator valve in accordance with a fully open position and a regulated position at the first regulation level, wherein the regulation method comprises:
regulating the flow of air in accordance with two regulation levels, the first regulation level for which the first controller sets the first regulator valve to a regulated position or in the event of a malfunction of the first regulator valve the second controller sets the second regulator valve to the regulated position, and a second regulation level for which the first controller and the second controller respectively set the first regulator value and the second regulator valve to the fully open position of both regulator valves, and
wherein the first regulation level corresponds to a first predetermined pressure set point, the second regulation level corresponds to a second predetermined pressure set point different than the first predetermined pressure set point.

2. The regulation method as claimed in claim 1, wherein the first regulation level corresponds to a pressure of the order of 3.45+/−0.3 bar.

3. The regulation method as claimed in claim 1, wherein the regulator device includes a control system transmitting signals to the first and second controllers and automatically switching the de-icing device to an activated state at the first regulation level or to an activated state at the second regulation level.

4. The regulation method as claimed in claim 3, wherein the control system switches the de-icing device to the activated state at the first regulation level or to the activated state at the second regulation level as a function of at least one characteristic of the flow of hot air and/or at least one parameter of the air around the aircraft.

5. The regulation method as claimed in claim 4, wherein the hot air source is provided by at least one outlet of an engine of the aircraft and in that the characteristic or characteristics of the flow of hot air is or are supplied by an engine control system.

6. The regulation method as claimed in claim 5, wherein the characteristic or characteristics of the flow of hot air is or are calculated from parameters of the engine known to the engine control system.

7. The regulation method as claimed in claim 3, wherein the control system switches the de-icing device:
from the activated state at the first regulation level N1 to the activated state at the second regulation level N2 when at least one characteristic of the flow of hot air and/or at least one parameter of the air around the aircraft has a value that falls below a given threshold K1, and
from the activated state at the second regulation level N2 to the activated state at the first regulation level N1 if at least one characteristic of the flow of hot air and/or at least one parameter of the air around the aircraft has a value that rises above a given threshold K2.

8. The regulation method as claimed in claim 7, wherein the given threshold K1 is lower than the given threshold K2.

9. The regulation method as claimed in claim 3, wherein the control system switches the de-icing device to the activated state at the second regulation level when the total air temperature TAT is lower than a total air temperature threshold $TAT_{ref1}$ and the temperature ST of the hot air supplied by the hot air source is lower than a temperature threshold $ST_{ref1}$ and the pressure SP of the hot air supplied by the hot air source is lower than a pressure threshold $SP_{ref1}$.

10. The regulation method as claimed in claim 9, wherein the control system switches the de-icing device to the activated state at the first regulation level when the total air temperature TAT is higher than a total air temperature threshold $TAT_{ref2}$ or the temperature ST of the hot air supplied by the hot air source is higher than a temperature threshold $ST_{ref2}$ or the pressure SP of the hot air supplied by the hot air source is higher than a pressure threshold $SP_{ref2}$, and
wherein the total air temperature threshold $TAT_{ref1}$ is lower than the total air temperature threshold $TAT_{ref2}$, the temperature threshold $ST_{ref1}$ is lower than the temperature threshold $ST_{ref2}$ and the pressure threshold $SP_{ref1}$ is lower than the pressure threshold $SP_{ref2}$.

11. The regulation method as claimed in claim 3, wherein the control system switches the de-icing device to the activated state at the first regulation level when the total air temperature TAT is higher than a total air temperature threshold $TAT_{ref2}$ or the temperature ST of the hot air supplied by the hot air source is higher than a temperature threshold $ST_{ref2}$ or the pressure SP of the hot air supplied by the hot air source is higher than a pressure threshold $SP_{ref2}$.

12. A device for de-icing a leading edge of an aircraft comprising:
a duct for routing a flow of hot air from a hot air source to at least one outlet;
a regulator device comprising:
a first regulator valve controlled by a first controller setting said first regulator valve in accordance with a fully open position and a regulated position at a first regulation level;
a second regulator valve controlled by a second controller setting said second regulator valve in accordance with a fully open position and a regulated position at the first regulation level; and
a control system configured for transmitting signals to the first and second controllers and automatically switching the de-icing device to an activated state at a first regulation level or to an activated state at a second regulation level,
wherein the first regulation level corresponds to a first predetermined pressure set point, the second regulation level corresponds to a second predetermined pressure set point different than the first predetermined pressure set point.

13. The de-icing device as claimed in claim 12, wherein the control system comprises:
a memory for storing at least one given threshold;
means for effecting at least one comparison between at least one characteristic of the flow of hot air and/or at least one parameter of the air around the aircraft and the given threshold or thresholds; and
means for generating at least one control signal for the regulator valve or valves as a function of the comparison or comparisons.

14. An aircraft including a de-icing device, the de-icing device comprising:
a duct for routing a flow of hot air from a hot air source to at least one outlet;
a regulator device comprising:
a first regulator valve controlled by a first controller setting said first regulator valve in accordance with a fully open position and a regulated position at a first regulation level; and
a second regulator valve regulated controlled by a second controller setting said second regulator valve in accordance with a fully open position and a regulated position at the first regulation level; and
a control system configured for transmitting signals to the first and second controllers and automatically switching the de-icing device to an activated state at a first regulation level or to an activated state at a second regulation level, wherein the first regulation level corresponds to a first predetermined pressure set point, the second regulation level corresponds to a second predetermined pressure set point different than the first predetermined pressure set point.

\* \* \* \* \*